US005217239A

United States Patent [19]

Koet

[11] Patent Number: 5,217,239

[45] Date of Patent: Jun. 8, 1993

[54] WHEELCHAIR

[75] Inventor: Leo Koet, Ackooy-Huigenstraat, Netherlands

[73] Assignee: Linido B.V., Pijnacker, Netherlands

[21] Appl. No.: 816,539

[22] Filed: Dec. 30, 1991

Related U.S. Application Data

[63] Continuation of Ser. No. 467,569, Jan. 19, 1990, abandoned.

[30] Foreign Application Priority Data

Jan. 20, 1989 [NL] Netherlands ........................ 8900141

[51] Int. Cl.[5] ............................................ B62M 63/02

[52] U.S. Cl. .............................. 280/250.1; 280/304.1; 280/647; 297/19; 297/44; 297/325

[58] Field of Search .................... 280/250.1, 304.1, 39, 280/647, 649, 47.38, 5.28, 5.30, 5.32, DIG. 10; 297/DIG. 4, 19, 325, 344

[56] References Cited

U.S. PATENT DOCUMENTS

| | | | |
|---|---|---|---|
| 2,818,910 | 1/1958 | Hawkins | 297/DIG. 4 |
| 3,142,351 | 7/1964 | Green | 280/DIG. 10 |
| 3,147,039 | 9/1964 | Smith et al. | 297/DIG. 4 |
| 3,227,465 | 1/1966 | Massie | 280/DIG. 10 |
| 4,026,568 | 5/1977 | Hallam | 280/647 |
| 4,193,147 | 3/1980 | Fischer | 297/DIG. 4 |
| 4,273,350 | 6/1981 | Williams | 280/647 |
| 4,477,117 | 10/1984 | Higgs | 297/DIG. 4 |
| 4,553,770 | 11/1985 | Lyman | 280/304.1 |
| 4,614,246 | 9/1986 | Masse et al. | 297/DIG. 4 |
| 4,647,066 | 3/1987 | Walton | 297/DIG. 4 |
| 4,693,490 | 9/1987 | Loodberg | 280/250.1 |
| 4,966,379 | 10/1990 | Mulholland | 280/250.1 |

*Primary Examiner*—Margaret A. Focarino
*Assistant Examiner*—A. M. Boehler
*Attorney, Agent, or Firm*—Beveridge, DeGrandi, Weilacher & Young

[57] ABSTRACT

In providing wheelchairs with a central suspension, which comprises a funicular quadrangle and parallelogram hinges, less effort is needed to adjust the position of the chair with respect to the chassis and, moreover, the danger of tumbling is considerably reduced.

9 Claims, 4 Drawing Sheets

WHEELCHAIR

This application is a continuation of application No. 07/467,569, filed Jan. 19, 1990, now abandoned.

The invention relates to a wheelchair, substantially comprising a chair being mounted on a collapsible chassis, which chair at least comprises a seat and a back-rest, in which the seat, the back-rest and the chassis are universally adjustable and collapsible.

A wheelchair of the above-mentioned type is known from international patent application W084/02647.

The said publication suggests to offer a simple solution for adapting a wheelchair to the wishes and dimensions of a user, so that manufacturers and suppliers of such objects can reduce their range of products considerably and supply at an attractive price per unit. This simple solution consists in the construction of the wheelchair out of a number of adjustable elements, being connected by elements in such a way that the seat, the back-rest and the footrest can take any possible position, both mutually and with respect to the chassis. Only casually, attention has been paid to the collapsibility of the component in said publication.

With the known wheelchair, the chair is adjustable round a fixed pivotal centre with respect to the chassis. During adjustment of the position of the chair with respect to the chassis, desired by the user or the nursing staff, the centre of gravity of user and chair together, has to move along a circular path. This results in the exertion of an effort, which can anyway exceed the user's powers, and which can also result in dangerous situations when the centre of gravity of user and chair, during driving, passes beyond the line of tumbling.

Firstly, the invention intends to cancel out the above-mentioned disadvantages, i.e. without giving up the advantages that relate to a limited range of wheelchairs.

According to the invention, one another has substantially been achieved in that the chair comprises a centrally located upper wing, seat beams and coupling rods, connecting the upper wing with the two seat beams in the manner of parallelogram hinges in the longitudinal direction of the wheelchair, and in that the chassis comprises a centrally located lower wing, two side frames, providing suspension, coupling plates, connecting the lower wing with the two side frames in the manner of parallelogram hinges in a transverse direction of the wheelchair, and in that the position of the upper wing with respect to the lower wing is adjustable.

The upper and lower wing are preferably part of a funicular quadrangle, the position of which can be changed by a component, which is longitudinally adjustable. Said longitudinally adjustable component may comprise a piston cylinder unit and a sheer blocking means, being located outside the funicular quadrangle.

If the wheelchair has a back-rest, said back-rest preferably comprises a centrally located back wing, back beams and pairs of back coupling rods, connecting the back wing with the two back beams in the manner of parallelogram hinges. In that case, the seat beams and the back beams, as well as the upper wing and the back wing have to be mutually, pivotally connected in such a way, that the seat beams and back beams, in the collapsed or lowered position of the backrest, each can simultaneously perform identical movements in mutually parallel planes. As a result of this, and while having the back-rest in its raised position, the seat and back-rest are automatically locked from collapsing. Collapsing can only occur with a collapsed back-rest. After collapsing, the back-rest is automatically locked from raising.

The pivot between the upper wing and the back wing and the pivots between the seat beams and the back beams are only in alignment when the wheelchair or chair is in its operational position.

The back-rest, in its raised position, can be automatically locked with respect to the seat, and in that case an unlocking member has to be operated so as to release the locking member. At the visible side of the back wing, a handle can be mounted, for collapsing and easily unfolding the back-rest again, or for simply lifting the whole chair, and for collapsing the chair.

A flexible element, like a belt, has been mounted between the coupling plates of the side frames for adjusting the height of the chair with respect to the wheels, i.e. by means of an adjustment for length, and for keeping the two side frames symmetrically with respect to the lower wing.

If arm supports have been mounted, it is preferred that they are adjustable in height and connected with the seat beams in a detachable and collapsible way.

Footrests, if present, are preferably mounted on the upper wing and longitudinally and angularly adjustable.

Below, the invention will be further elucidated on the basis of the drawing, in which a number of embodiments of a wheelchair according to the invention has been shown as an example. In the drawing.

Figure 1:
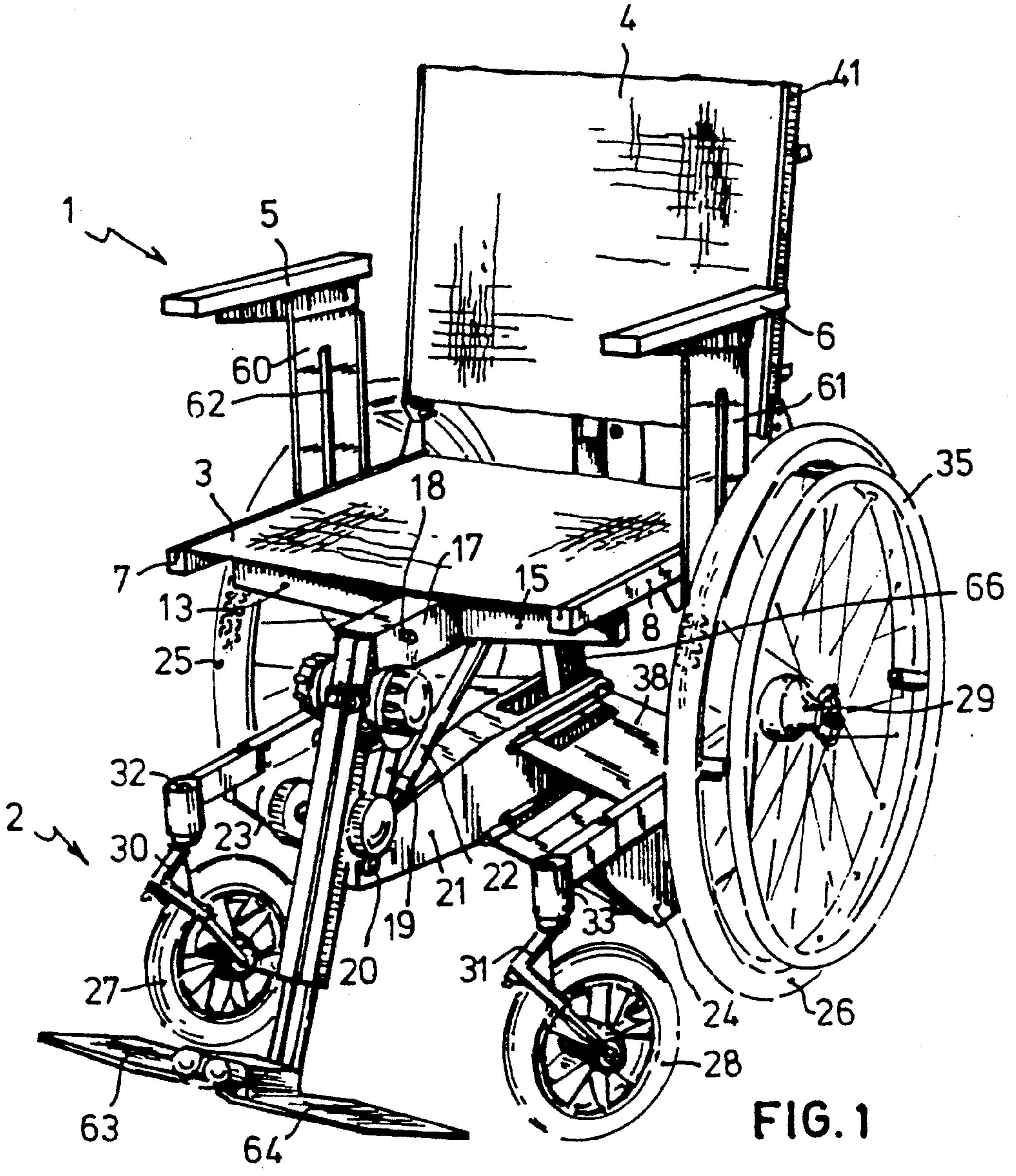
FIG. 1 is a perspective frontal view of the wheelchair in an operational position.

The wheelchair, as illustrated in the drawing, comprises a chair 1 and a chassis 2.

The chair 1, as usual, comprises a seat 3 and a back-rest 4 of foldable material, and two arm supports 5 and 6 of slightly yielding material.

The foldable material of the seat 3 is mounted on two seat beams 7, 8, which extend in the movement direction of the wheelchair.

Figure 2:
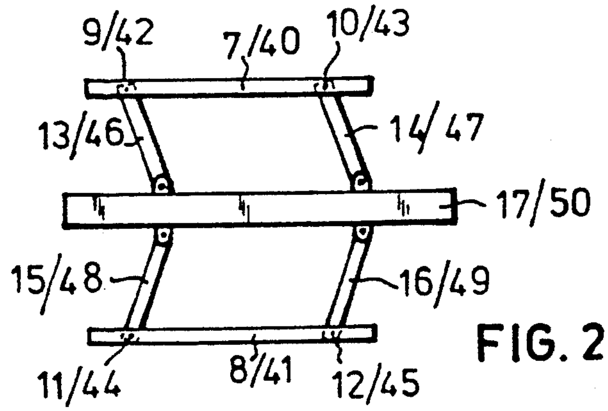
FIG. 2 is a diagram of parallelogram hinges of the seat in the longitudinal direction of the wheelchair and the back-rest.
Figure 3:
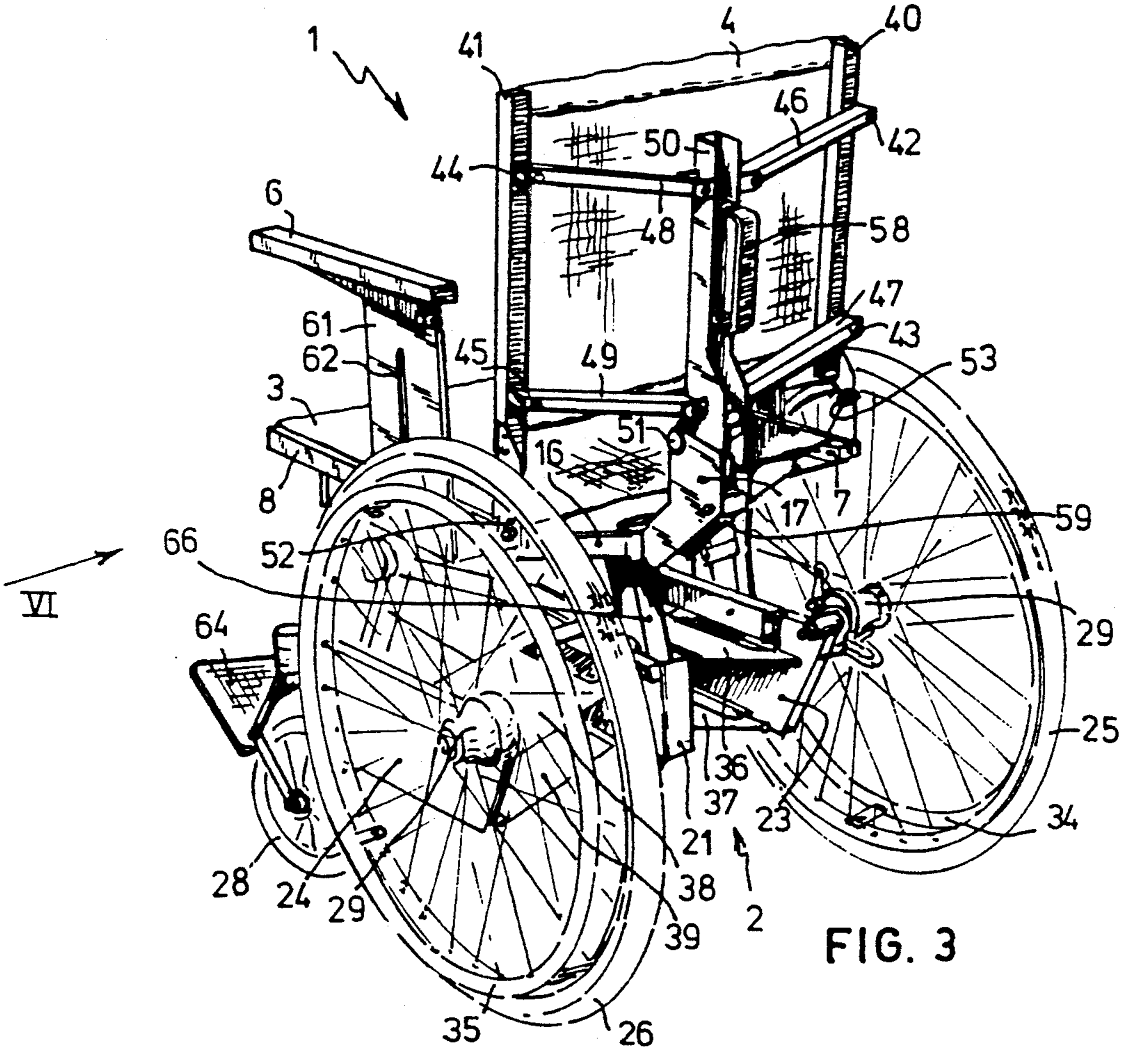
FIG. 3 is a perspective rear view of the wheelchair of FIG. 1.

The undersides of the two seat beams 7, 8 are pivotally connected with the one end of two pairs of coupling rods 13, 14/15, 16, by means of two pairs of longitudinally located pivots 9, 10/11, 12. The other ends of these coupling rods 13-16 are pivotally connected with a centrally located upper wing 17. In this way two parallelogram hinges are created in the longitudinal direction of the wheelchair, which parallelogram hinges make it possible to move the seat beams 7, 8 towards one another for collapsing the seat 3, in which the seat beams 7, 8 will exactly abut the upper wing 17 in vertical planes, i.e. in a forwardly moved position with respect to the operational position of the wheelchair. One another is shown in FIG. 2, in which corresponding components of the back-rest have been indicated also. The upper wing 17 is pivotally connected round a horizontal cross-axle 18 with the upper end of a front sleeve 19 at the front of the wheelchair. The lower end of the front sleeve 19 is pivotally connected round a horizontal cross-axle 20 to the front end of a centrally located lower wing 21, which belongs to the chassis 2. The upper wing 17, the front sleeve 19 and the lower wing 21 together with a rear sleeve 66, form a trapezium-shaped construction. A component 22, being longitudinally adjustable, like a bush, having internal screw threads of opposite pitch at both ends, has been mounted between the axis 20, at or near the front end of the lower wing 21 and a position, more to the back on the upper wing 17. Upon adjusting the bush 22, the position of the upper wing 17, and therefore the position of the chair 1 connected therewith, can be adjusted with respect to the lower wing 17, i.e. with respect to the ground. A consequence of this manner of angular adjustment is that the driving balance is optimal, because the horizontal and vertical displacement of the centre of gravity of chair and user together, is minimal over the adjustment outreach with respect to the chassis, so that the risk of tumbling is considerably smaller than with known wheelchairs.

The chassis 2, furthermore, comprises two side frames 23, 24, which provide suspension on the ground. In the illustrated embodiment, this suspension comprises two capstan wheels 25, 26 with pneumatic tires, located at or near the rear end of the wheelchair, and two relatively small castors 27, 28 with solid tires, located more forwardly. The capstan wheels 25, 26 have been connected with the side frames by firm horizontal wheel axles 29, and the castors 27, 28 are supported on bearings in swivelling straps 30, 31, which are connected with the side frames round a substantially vertical swivel axle 32, 33. If these connections are telescopically constructed, like with sleeve assemblies, it is also possible to mount the greater capstan wheels at the front of the wheel chair, and the smaller castors at the back. The wheelbase can be changed in this way too. Hoops 34, 35 have been mounted on the capstan wheels, with the aid of which the user can move the wheelchair forward and control it. The components 25 to 35 inclusive, however, are not essential for the invention, since they can be replaced by other suitable suspensions, in which e.g. there is talk of electric movement or control. The electric driving of the bush 22 for adjusting the position of the seat with respect to the bottom, also belongs to the possibilities. An alternative construction of the bush 22 will be illustrated in FIG. 7.

Figure 4:
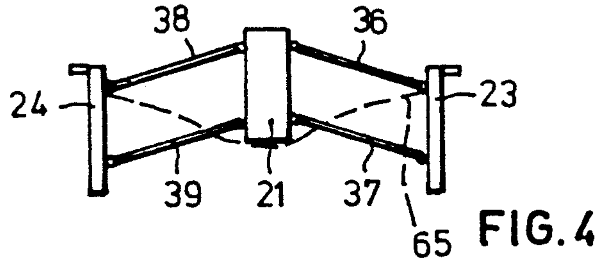
FIG. 4 is a diagram of parallelogram hinges of the chassis in the transverse direction of the wheelchair.
Figure 5:
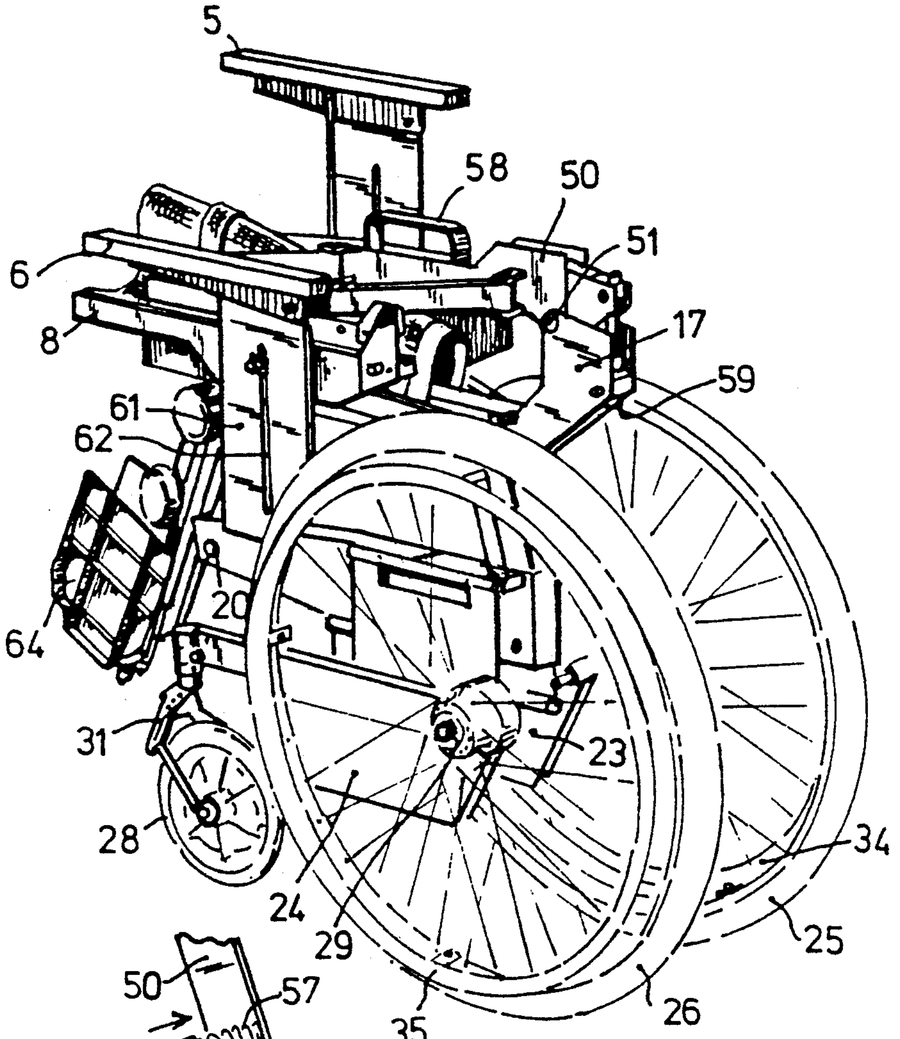
FIG. 5 is a perspective view of the wheelchair of FIG. 3 in a collapsed position.

The side frames 23, 24 are both pivotally connected with the lower wing 21 round substantially horizontal axles by means of pairs of coupling plates 36, 37/38, 39. In this way two parallelogram hinges (FIG. 4) are created in transverse direction of the wheelchair, said parallelogram hinges enabling the side frames 23, 24 to move to each other, i.e. in a downwardly moved position with respect to the operational position of the wheelchair. The maximal distance between the side frames 23 and 24 and consequently the height of the seat 3 above the bottom is adjustable by means of a belt 65, which is mounted on the top edge of the side frames and beneath the lower wing 21. The length of the belt can be changed at the ends or just in the centre.

The foldable material of the back-rest 4 is mounted on two back beams 40, 41. The rear sides of the two back beams 40, 41 are pivotally connected with the one ends of two pairs of back coupling rods 46, 47/48, 49, by means of two pairs of spaced pivots 42, 43/44, 45. The other ends of these back coupling rods 46-49 are pivotally connected with a centrally located back wing 50. In this way, just like with the chassis (vide FIG. 2), two parallelogram hinges are created in transverse direction of the wheelchair, which permits the back beams 40, 41 to move towards each other, so as to collapse the back-rest 4, i.e. in an upwardly moved position with respect to the operational position of the wheelchair.

The "width" of the chair is determined by the length of the coupling rods 36-39 and 46-49. Should it be necessary to include chairs of different widths in the range, then, universal coupling rods having several pivots could be produced, which according to one's needs will be cut off at the required length.

The back wing 50 is pivotally connected with the upper wing 17 round a cross-axle. The seat beams 7, 8 and back beams 40, 41, are mutually pivotally connected by means of pivots 52, 53. In the operational position, the pivots 51-53 are in alignment, however, in the collapsed and folded position they are not alignment. The components of the back-rest and the seat are dimensioned and mutually connected in such a way, that during the collapsing of the chair in transverse direction, the seat beams 7, 8 and the back beams 40, 41 simultaneously perform identical movements in two parallel planes. Because of this, the seat 3 and the back-rest 4 are automatically locked from collapsing in the transverse direction, when the back-rest 4 is raised, and the back-rest is locked from raising when the seat is collapsed.

A handle 58 has been mounted at the rear side (in operational position), respectively, the top side of the back wing 50, with the aid of which the collapsed chair or wheelchair can be lifted, if desired. Moreover, this handle facilitates the restoring to its operational position.

Figure 6:
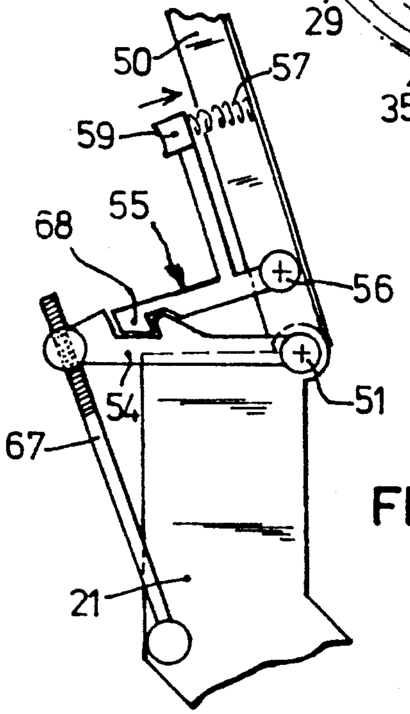
FIG. 6 is a schematic view of the locking member between the upper wing and the back wing, in the direction of arrow VI in FIG. 3.

The back-rest, is preferably automatically locked in its operational position, and it can only be collapsed after operating an unlocking member, which will be further elucidated on the basis of FIG. 6. If there is no locking member, the wheelchair cannot be wheeled.

Figure 7:
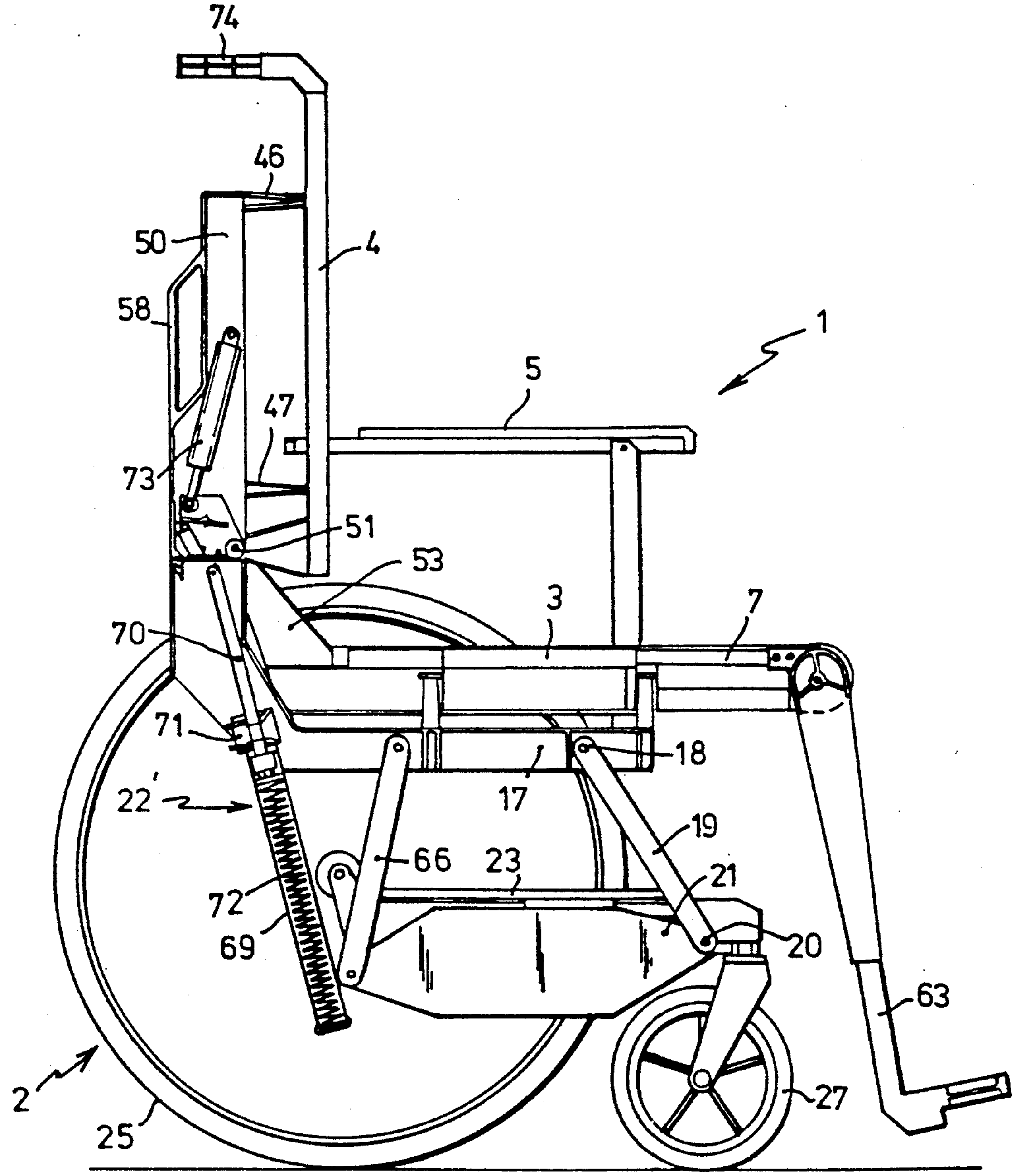
FIG. 7 is a schematic side view of another embodiment.

The arm supports 5, 6 are mounted on the seat beams 7, 8 by means of two sliding plates 60, 61 with a groove 62, which substantially extends along the entire height, for including screw and nut connections that are continuously connected with the seat beams. Upon sliding the arms supports 7, 8 downwardly, the chair takes up even less space in its collapsed position. The distance between the arm supports, apparently should be large enough for collapsing the back beams 40, 41 against the longitudinal beams 7, 8. In FIG. 7, which still has to be discussed, the arm supports have been suspended in another way, though.

The front end of the upper wing 17 is a suitable place for mounting the footrests 63, 64, which are not of further interest to the invention, and therefore, they will not be described in detail.

FIG. 6 illustrates that the upper wing 17 and the back wing 50 are pivotally connected with each other by means of the cross axle 51. Around said cross axle, a pawl rod 54, provided with a recess, has been pivotally supported. On the back wing 50, a lever 55 is supported round a shaft 56. The one arm of the lever is provided with a projection 68 which can engage with the recess of the pawl rod 54, and the other arm of the lever is loaded by a pressure spring 57 in such a way that by pressing the spring 57 by means of the button 59, the unlocking can be effected. The position of the back-rest in its operational position is adjustable by a screw rod 67, which is mounted between the end of the pawl rod 54 and a lower located point on the upper wing 21.

The embodiment illustrated in FIG. 7, substantially distinguishes itself from the first embodiment by a different, longitudinally adjustable component 22', which is mounted on another place. The other components of FIG. 7, which entirely correspond with the components in question of FIGS. 1-6, have been indicated by the same reference numerals, with the nonvisible components of FIG. 7 placed between brackets.

Therefore the chair 1 of FIG. 7 also comprises a chassis 2, a seat 3 and a back-rest 4 of foldable material and two arm supports 5. The chassis 2 consists of two capstan wheels 25 (26) with pneumatic tires and two relatively small castors 27, (28). The changing of the wheel base is also possible here. The foldable material of the seat 3 is mounted on two seat beams 7 (8). The footrests 63 (64) have been mounted on the seat beams now, yet this cannot be seen as an essential feature of the invention.

The upper wing 17, the front sleeve 19 and the lower wing 21 together with the rear sleeve 66, form a trapezium-shaped construction again. The back coupling rods 46 and 47 as well as the back wing 50, connected with the lower wing 21 round a cross axle 51, and the handle are visible at the back-rest 4.

The characterizing feature of the embodiment of FIG. 7 now, is that the longitudinally adjustable component 22' consists of a piston cylinder unit, located outside the funicular quadrangle, which is composed of a cylinder 69, mounted on the lower wing 21, and a piston rod 70, mounted on the upper wing 17, which can be locked by a sheer safety means 71. A spring 72 has been accommodated in the cylinder 69, loading the piston and the piston rod 70.

A gas spring 73, supplying an adjustment of the angle between the seat 3 and the back-rest 4 in its unlocking state, and allowing a certain amount of spring action to the back-rest in its locking state, has been mounted as an extra provision.

The fact that the wheelchair as illustrated in FIG. 7 also comprises handles 74, which are mounted on the back-rest 4, is no essential feature of the invention.

Embodiments, other than the ones illustrated in the drawing, also fall within the scope of the claims.

I claim:

1. A wheelchair for providing movement in a longitudinal direction, said wheelchair having a chair mounted on a collapsible chassis, which chair at least comprises a seat and a back-rest, the seat being angularly adjustable and collapsible, said wheelchair comprising:

a centrally located upper wing extending in said longitudinal direction, two seat beams substantially parallel to said upper wing, one seat beam on each side of said upper wing, and coupling rods, pivotally connecting said upper wing with said two seat beams and being movable in said longitudinal direction, said chassis further comprising a centrally located lower wing extending in said longitudinal direction, two side frame substantially parallel to said lower wing, one side frame on each side of said lower wing and providing suspension, and coupling members pivotally connecting said lower wing with said two side frames and being movable in a vertical direction transverse to said longitudinal direction, said upper wing and said lower wing being pivotally connected to first and second members of fixed length at first pivot points, said upper wing, said lower wing and said first and second members thereby forming a funicular quadrangle, and a component of adjustable length which is pivotally connected at second pivot points to said upper wing on one end and to said lower wing on another end, at least one of said second pivot points which connects said component of adjustable length to said upper wing and said lower wing not coinciding with said first pivot points where connect said upper wing and said lower wing to said first and second members, whereby an angular position of said upper wing with respect to said lower wing can be adjusted.

2. A wheelchair according to claim 1, having vertically adjsutable arm supports mounted on said two seat beams.

3. A wheelchair according to claim 1, wherein said component of adjustable length comprises a piston cylinder and a locking means, located outside said funicular quadrangle.

4. A wheelchair according to claim 1, wherein said back-rest comprises a centrally located back wing, two back beams and back coupling rods pivotally connecting said back wing with said two back beams and being movable substantially parallel to a plane of said back-rest.

5. A wheelchair according to claim 4, wherein said upper wing and said back wing are pivotally connected such that said two seat beams and said two back beams, in a collapsed position of said backrest, can each simultaneously perform identical movements in mutually parallel planes.

6. A wheelchair according to claim 5, wherein a pivot between said upper wing and said back wing, and pivots between said seat beams and said back beams are only in alignment in an operational position.

7. A wheelchair according to claim 4, wherein said back-rest in its raised positions is automatically located with respect to said seat by means of locking member, and in that an unlocking member is mounted for releasing said locking member.

8. A wheelchair according to claim 4, further comprising a handgrip mounted on a visible side of said back wing.

9. A wheelchair for providing movement in a longitudinal direction, said wheelchair having a chair mounted on a collapsible chassis, which chair at least comprises a seat and a back-rest, the seat being angularly adjustable and collapsible, said wheelchair comprising:

a centrally located upper wing extending in said longitudinal direction, two seat beams substantially parallel to said upper wing, one seat beam on each side of siad upper wing, and coupling rods, pivotally connecting said upper wing with said two seat beams and being movable in said longitudinal direction said chassis further comprising a centrally located lower wing extending in said longitudinal direction, two side frames substantially parallel to said lower wing, one side frame on each side of said lower wing and providing suspension, and coupling members pivotally connecting said lower wing with said two side frames and being movable in a vertical direction transverse to said longitudinal direction, and a flexible element, being longitudinally adjustable, mounted between said coupling members of said two side frames, the length of which defines the height of said chair with respect to said side frames.

* * * * *